United States Patent
Powell

(10) Patent No.: US 12,430,730 B2
(45) Date of Patent: Sep. 30, 2025

(54) CORRECTING DISTORTION FROM CAMERA PITCH ANGLE

(71) Applicant: Microsoft Technology Licensing, LLC, Redmond, WA (US)

(72) Inventor: Karlton David Powell, Lake Stevens, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 287 days.

(21) Appl. No.: 17/998,185

(22) PCT Filed: May 4, 2021

(86) PCT No.: PCT/US2021/030566
§ 371 (c)(1),
(2) Date: Nov. 8, 2022

(87) PCT Pub. No.: WO2021/231129
PCT Pub. Date: Nov. 18, 2021

(65) Prior Publication Data
US 2023/0230210 A1   Jul. 20, 2023

(30) Foreign Application Priority Data
May 13, 2020 (NL) .................................. 2025575

(51) Int. Cl.
*G06T 5/80* (2024.01)
*G06T 3/047* (2024.01)

(52) U.S. Cl.
CPC .............. *G06T 5/80* (2024.01); *G06T 3/047* (2024.01); *G06T 2207/10016* (2013.01)

(58) Field of Classification Search
CPC . G06T 5/80; G06T 3/047; G06T 2207/10016; G06T 3/00; H04N 25/61
See application file for complete search history.

(56) References Cited

U.S. PATENT DOCUMENTS

| 7,058,237 B2 | 6/2006 | Liu et al. |
| 7,961,980 B2 | 6/2011 | Shih |
| 8,643,747 B2 | 2/2014 | Chou |

(Continued)

FOREIGN PATENT DOCUMENTS

WO    2006090320 A1    8/2006

OTHER PUBLICATIONS

"Non Final Office Action Issued in U.S. Appl. No. 17/243,405", Mailed Date : Feb. 17, 2022, 10 Pages.

(Continued)

*Primary Examiner* — Phung-Hoang J Nguyen
(74) *Attorney, Agent, or Firm* — Alleman Hall & Tuttle LLP

(57) ABSTRACT

One disclosed example provides a videoconferencing system comprising a processor and a storage device storing instructions executable by the processor to obtain an image of a scene acquired via a camera, the image of the scene comprising image distortion arising from a camera pitch angle at which the image of the scene was acquired. The instructions are further executable to apply a projection mapping to the image of the scene to map the image of the scene to a projection comprising a tilt parameter that is based upon the camera pitch angle at which the image of the scene was acquired, thereby obtaining a corrected image, and output the corrected image.

19 Claims, 15 Drawing Sheets

(56) References Cited

U.S. PATENT DOCUMENTS

| | | | |
|---|---|---|---|
| 8,687,070 | B2 | 4/2014 | Chen et al. |
| 11,277,544 | B2 | 3/2022 | Powell |
| 2006/0033999 | A1 | 2/2006 | Liu et al. |
| 2006/0209194 | A1 | 9/2006 | Liu et al. |
| 2009/0051797 | A1 | 2/2009 | Yao |
| 2010/0208032 | A1 | 8/2010 | Kweon |
| 2011/0069148 | A1 | 3/2011 | Jones et al. |
| 2013/0229482 | A1 | 9/2013 | Vilcovsky et al. |
| 2013/0335451 | A1 | 12/2013 | Tsuji |
| 2014/0184850 | A1* | 7/2014 | Raju .................. H04N 7/147 348/239 |
| 2015/0109401 | A1 | 4/2015 | Kasatani et al. |
| 2016/0027158 | A1 | 1/2016 | An et al. |
| 2019/0012766 | A1 | 1/2019 | Yoshimi |
| 2019/0082114 | A1 | 3/2019 | Jeon |
| 2019/0258149 | A1 | 8/2019 | Ishii |
| 2020/0137379 | A1* | 4/2020 | Tsunashima ......... H04N 13/363 |
| 2020/0259347 | A1 | 8/2020 | Pereira et al. |
| 2021/0044725 | A1 | 2/2021 | Powell |
| 2021/0127059 | A1 | 4/2021 | Powell et al. |
| 2022/0366547 | A1 | 11/2022 | Powell |

OTHER PUBLICATIONS

"Non Final Office Action Issued in U.S. Appl. No. 17/243,405", Mailed Date: Oct. 7, 2022, 11 Pages.

"Notice of Allowance Issued in U.S. Appl. No. 17/243,405", Mailed Date: Jun. 24, 2022, 5 Pages.

Cao, et al., "The Two-Dimensional Code Image Tilt Correction Method based on Least Squares Support Vector Machines", In Proceedings of International Conference on Audio, Language and Image Processing, Jul. 7, 2014, pp. 926-930.

"International Search Report Issued in Netherland Patent Application No. N2025575", Mailed Date: Mar. 2, 2021, 14 Pages.

"International Search Report & Written Opinion issued in PCT Application No. PCT/US21/030566", Mailed Date: Jul. 21, 2021, 14 Pages.

"International Search Report and Written Opinion Issued in PCT Application No. PCT/US22/023237", Mailed Date: Jul. 18, 2022, 12 Pages.

"Notice of Allowance Issued in U.S. Appl. No. 17/243,405", Mailed Date: Feb. 7, 2023, 5 Pages.

U.S. Appl. No. 17/243,405, filed Apr. 28, 2021.

U.S. Appl. No. 16/582,183, filed Sep. 25, 2019.

\* cited by examiner

UNTILTED CYLINDRICAL PROJECTION

CORRECTING DISTORTION FROM CAMERA PITCH ANGLE

CROSS REFERENCE TO RELATED APPLICATIONS

The present application is a U.S. National Phase of International Patent Application Serial No. PCT/US2021/030566 entitled "CORRECTING DISTORTION FROM CAMERA PITCH ANGLE", filed May 4, 2021, which claims priority to Netherlands Patent Application Serial No. 2025575, filed May 13, 2020, the entire contents of each of which are hereby incorporated by reference for all purposes.

BACKGROUND

Cameras are used for communication in many different settings. For example, cameras are commonly used in conference rooms to allow video image data of meetings to be sent to remote locations for others to participate in the meetings. In this manner, people at remote locations can enjoy a more collaborative experience than with audio alone.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

One disclosed example provides a videoconferencing system comprising a processor and a storage device storing instructions executable by the processor to obtain an image of a scene acquired via a camera, the image of the scene comprising image distortion arising from a camera pitch angle at which the image of the scene was acquired. The instructions are further executable to apply a projection mapping to the image of the scene to map the image of the scene to a projection comprising a tilt parameter that is based upon the camera pitch angle at which the image of the scene was acquired, thereby obtaining a corrected image, and output the corrected image.

DETAILED DESCRIPTION

Figure 1:
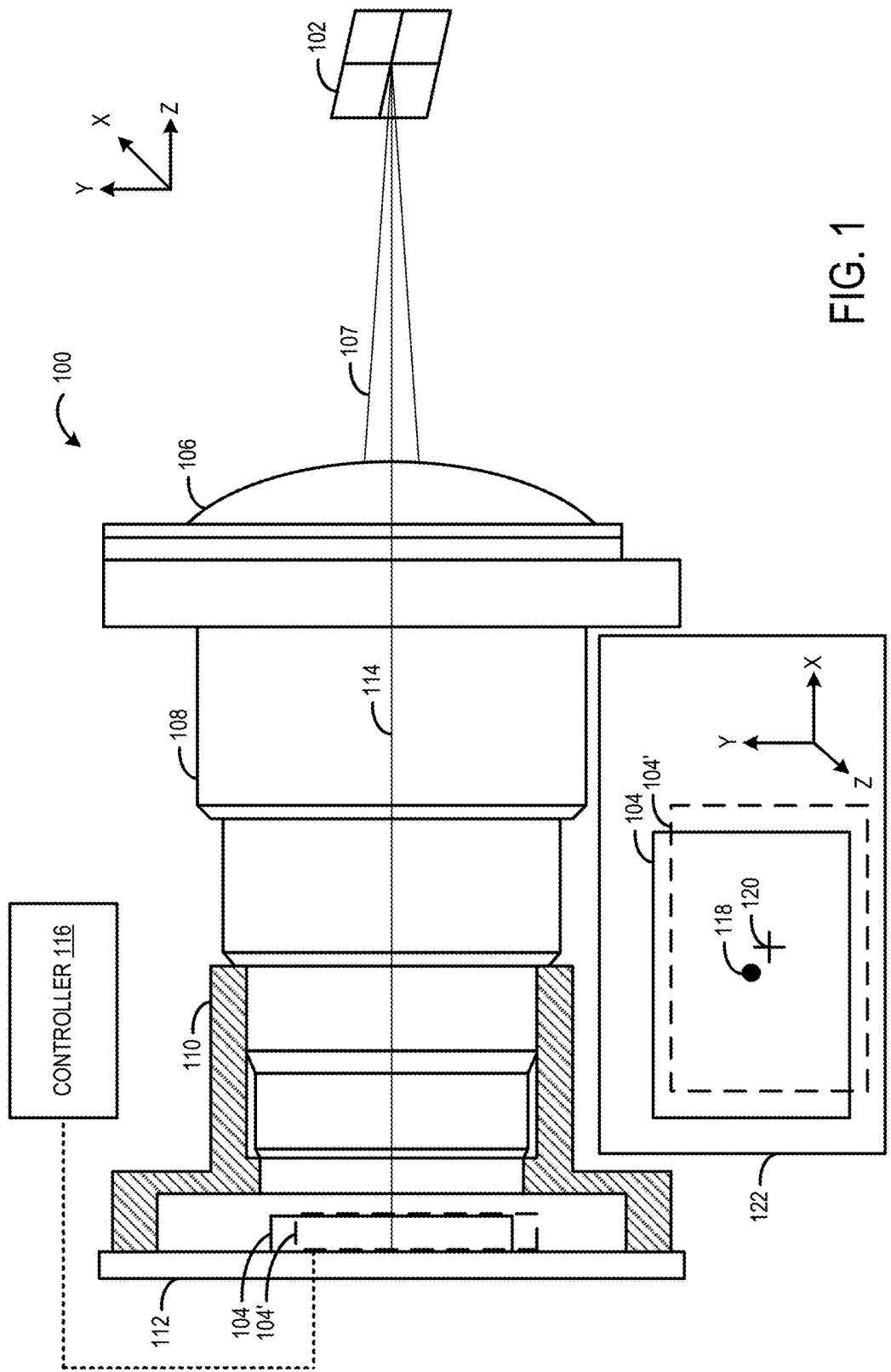
FIG. 1 schematically shows an example camera useable in a videoconferencing system.

A camera directs light from a scene onto a flat image sensor to capture an image of the scene in an image frame. In many settings, particularly indoors such as a conference room, a wide-angle camera may be used to image multiple subjects of interest that are spread out. Cameras employing wide-angle lenses capture light from a wide angular field of view (FOV), but suffer from various types of optical distortion, such as trapezoidal distortion, barrel distortion, pincushion distortion, and/or TV distortion. The level of distortion may be more pronounced at higher field angles from the optical axis of the camera. Standard low geometric distortion, or low TV distortion, camera lenses, which may have a horizontal FOV between 40° and 70°, may have mild distortion, whereas wide-angle (70°-90° FOV) and ultra wide-angle (>90° FOV) lenses may have more significant distortion at the edges and corners of the image frame. Low TV distortion requires increased complexities such as aspheric profiles, number of elements, and tighter tolerances for higher FOV lens designs, for instance a reasonable mass-producible 120 deg horizontal FOV lens design may suffer from 6% TV distortion. Further, since there is often a disparity between the angular subtend across HFOV captured by a camera and the effective angular subtend as seen by a viewer viewing the camera-captured scene as displayed on an computer and/or interactive display, the viewer typically cannot fully appreciate the low TV distortion, since wide FOV frame captures would require shorter viewing distance for best viewing of the displayed scene content. As a result, wide FOV scenes captured using low TV distortion lenses may appear to have trapezoidal stretching in the corners of the FOV. Since low TV distortion lenses are not readily available much beyond 120 deg, and theoretically limited to 180 degree, fisheye type lenses may be used for capturing a wide FOV scene. As a result, using an ultra wide-angle lens in a conference room setting, for example, people in an image standing near the sides of the FOV may appear to be warped and standing at non-vertical angles, among other distortions. The unnatural appearance of people and other objects in the images may provide for an unsatisfactory experience for remote videoconference participants.

In some distortion correction approaches, a raw image from a camera is mapped to an analytical geometric projection that approximates the arrangement of people and/or other objects of interest in the imaged space. In the example of a conference room, a semicircular arrangement of people standing or seated around a camera may approximate a cylindrical shape. As such, a cylindrical projection may be used to correct images for distortion by mapping the raw image to a cylindrical projection. In some examples, such a mapping may be based upon an optical center of a lens of the camera, so that the optical center and the center of the projection are aligned. Likewise, the projection also may be based on a known or approximate distortion function of the lens. In the corrected image, vertically oriented objects in the scene, such as people standing near the sides of the camera FOV, may appear straight and vertically oriented instead of warped and/or leaning, and thus have a more natural appearance. As used herein, the term "raw image" means an image that is generated without any distortion correction and may include monochrome images, color images, and images that have been at least partially processed.

However, some camera placements may pose challenges to distortion correction. For instance, a videoconferencing camera may be placed on a wall above, or attached to the top of, a videoconference display. A camera facing horizontally outwardly from this position may waste much of the image frame imaging the ceiling, when the region of interest comprises the conference participants in the room. Offset imaging, in which the optical center of the image sensor is offset relative to the optical axis of the lens, may be used as one approach to achieve appropriate correction in this situation. However, such a solution involves the use of either a dedicated offset image sensor or oversized image sensor. While offset imaging may allow a camera to capture a field of view downwardly at a bias angle, offset imaging may not accommodate different camera heights and mounting angles unless the image sensor comprises sufficient pixel area to accommodate the resulting shift in bias angle.

Another approach to avoid imaging too much of the ceiling is to tilt the camera downwardly. However, a cylindrical projection may not adequately correct for distortion in an image acquired with a tilted pitch angle. A cylindrical projection distortion correction may be premised on an optical axis of a camera having a horizontal orientation. Where the optical axis is tilted downwardly, the projection may straighten out vertically oriented objects, but the objects may appear to lean toward a side of the image.

Accordingly, examples are disclosed that relate to correcting distortion in an image acquired using a camera having a tilted pitch angle. Briefly, the disclosed examples apply a projection comprising a tilt parameter based on the camera pitch angle. The use of such tilted projections to correct distortion in images from a standard wide-angle camera may avoid the use of oversized image sensors and the angular constraints of offset image sensors. Further, different projections may be determined and/or stored for different tilt angles, thereby allowing an appropriate correction to be applied based upon a current camera tilt angle. Using such a correction, people and other vertically oriented objects near the sides of image may appear to stand straight and vertically, as opposed to having an outward lean. The more natural appearance of people in the image may help remote videoconference participants to feel more "present" in the videoconference, compared to an uncorrected image or an image corrected without use of a tilt parameter. While described herein in the context of a conference room setting, the disclosed examples may be used with any suitable camera in any suitable interior or exterior setting.

Prior to discussing the use of a tilt parameter in a projection model, an example camera 100 is described with reference to FIG. 1. The camera 100 is configured to image a scene 102. The camera 100 includes an image sensor 104 and a lens 106 positioned to direct object light 107 from the scene 102 onto the image sensor 104. The lens 106 may take any suitable shape and may including any suitable optical material having any suitable optical characteristics. In some implementations, the lens 106 may be a system of two or more lenses or other optical elements. As a more specific example, the lens 106 may be an f-θ lens, which may comprise a known linear or near-linear lens distortion function. The use of an f-θ lens in the camera may help to ensure a nearly linear relationship between the image sensor space and the incidence angle. The lens 106, having lens elements held in lens barrel 108, may be maintained in a center fixed position relative to the image sensor 104 via a holder mount structure 110. In some examples, the holder mount structure 110 is a rigid holder structure that fixes the lens barrel 108, and thus all elements in the lens 106 relative to the image sensor 104 along every axis in six degrees of freedom (e.g., x, y, z, tip, tilt, azimuth rotation). For example, a fixed-focus camera may have such an arrangement. In some examples, the holder mount structure 110 may allow movement of the lens barrel 108 relative to the image sensor along one or more axes (e.g., for image stabilization and/or focus, such as by placing an auto-focus voice-coil actuator between lens barrel 108 and holder mount structure 110). In such examples, the lens 106 is still center fixed relative to the image sensor 104 even though the position of the lens 106 may move along the z axis relative to the position of the image sensor 104.

In the illustrated nonlimiting example camera, the lens barrel 108 is operatively coupled to the holder mount structure 110. The holder mount structure 110 is mounted to a printed circuit board (PCB) 112. In one example, the holder mount structure 110 is bonded to the PCB 112 via an adhesive. The image sensor 104 is mounted on the PCB 112 such that an optical axis 114 of the lens 106 is substantially aligned with a center of the image sensor 104. In particular, the lens barrel 108, the holder mount structure 110, and the PCB 112 collectively maintain the lens 106 in optical alignment with the image sensor 104 (e.g., for the case of using a threaded lens barrel 108 and holder mount structure 110, the holder mount structure 110 may be bonded in position relative to PCB 112 to fix x, y, z position and tip/tilt angle while threads may be substantially used to set the focus). Alternatively, as may be the case for using active alignment (AA), pre-focus position may be set by optically, or mechanically, fixing focus position between lens barrel 108 and holder mount structure 110. Once fixed in this manner, the lens and holder assembly may be actively adjusted in all degrees of freedom and bonded with a gap bond between holder mount structure 110 and PCB 112 to fix x, y, final z focus, tip, tilt and azimuth rotation. Further still, a threadless lens holder may first be bonded to PCB, followed by AA positioning and bonding of a lens having threadless lens barrel.

The camera 100 further comprises a controller 116 configured to control the image sensor 104 to acquire images of the scene 102 as well as to perform other control operations of the camera 100 as discussed herein. The controller 116 may include a logic subsystem and a storage subsystem. The logic subsystem includes one or more physical devices configured to execute instructions held by the storage subsystem to enact any operation, algorithm, computation, or transformation disclosed herein. In some implementations, the logic subsystem may take the form of an application-specific integrated circuit (ASIC) or system-on-a-chip (SoC), in which some or all of the instructions are hardwareor firmware-encoded. The logic subsystem and the storage subsystem of the controller 116 are discussed in further detail with reference to FIG. 15.

During the manufacturing process of the camera 100, manufacturing tolerances of the camera 100 may result in camera-to-camera variations in optical alignment of the image sensor 104 and the lens 106 that may result in a position of the image sensor being shifted from an ideal position that is aligned with the lens 106. The image sensor 104' is shown having a position that is shifted relative to the ideal position of the image sensor 104 that is aligned with the lens 106. Moreover, manufacturing tolerances of the lens 106 itself may contribute to variations in optical alignment of the image sensor 104 and the lens 106. As shown in the sidebar 122, the optical axis 114 of the lens 106 is centered at an actual optical center 118 of the lens 106 relative to the image sensor 104 when the image sensor 104 is ideally aligned with the lens 106. However, the actual optical center 118 of the lens 106 is offset from a center 120 of the image sensor 104' when the image sensor 104' has a position that is shifted relative to the ideal position of the image sensor 104. The difference between the center 120 of the image sensor 104' and the actual optical center 118 of the lens 106 may affect the image distortion attributed to the lens.

The actual optical center 118 may vary from camera to camera such that different cameras generate raw images having different distortion based on having different camera-specific optical centers. As such, in some examples, the application of a tilted projection distortion correction to an image may be based upon a determined optical center along with lens nominal distortion data. The optical center may be determined in any suitable manner. As one example, the optical center may be determined on a camera-by-camera basis during manufacturing by projecting a flat field of illumination through lens 106 onto the image sensor 104, and measuring a centroid of an image intensity profile to determine the optical center. Note that if the camera includes lenses that have limited relative illumination roll-off, a live image based pointing measurement including a calibrated test setup having an optical target with positional reference to the lens optical axis, which may be repeatably mounted by use of kinematic mechanical mounting of lens barrel, may be expected to provide higher accuracy for optical center measurement. As another example, a laser beam aligned with the optical axis 114 may be used to measure the optical center 118. In other examples, a tilted projection distortion correction may be based upon any other suitable calibration.

Figure 2:
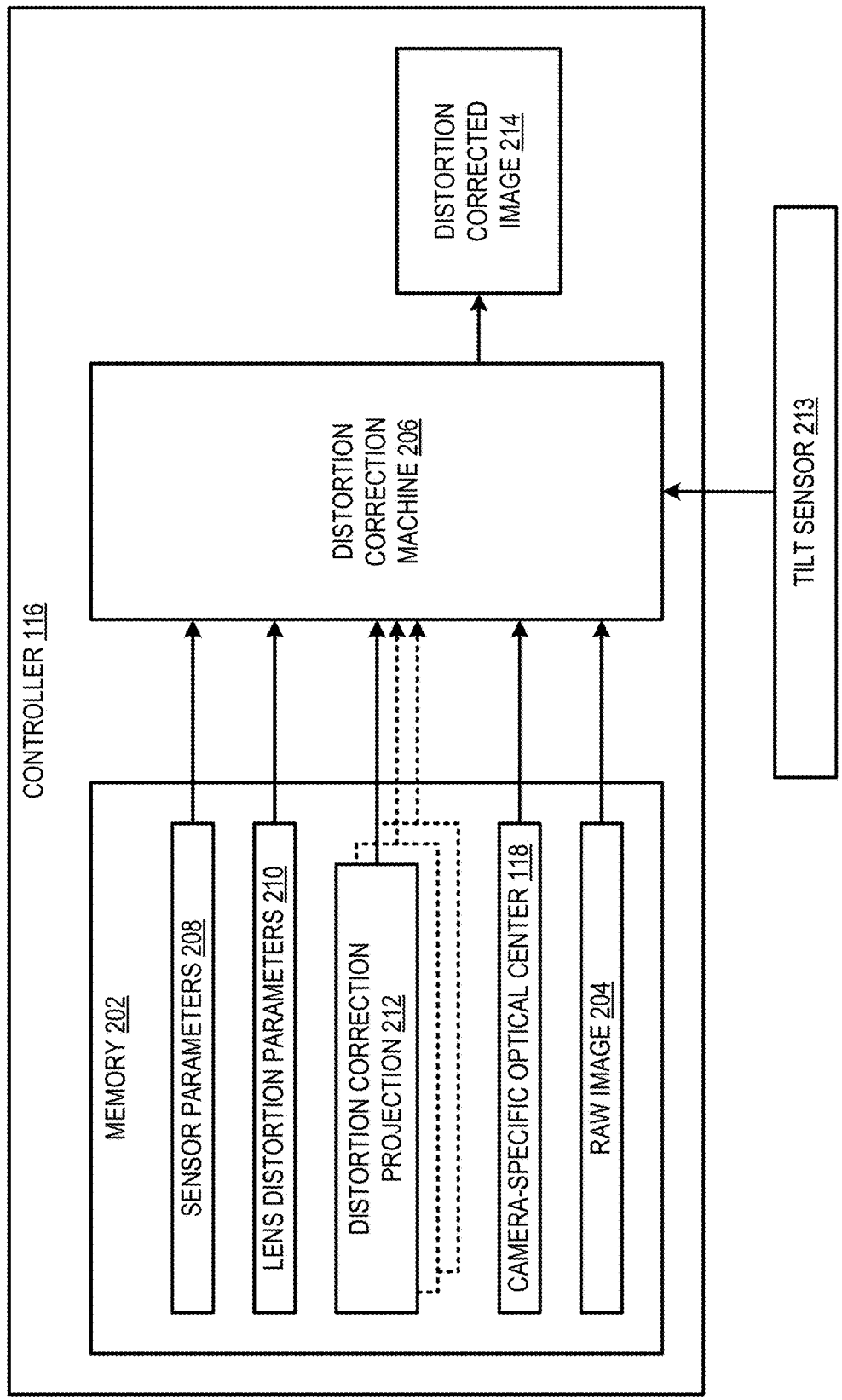
FIG. 2 schematically shows an example camera controller configured to generate distortion-corrected images by applying a projection mapping comprising a tilt parameter.

FIG. 2 shows a block diagram of the controller 116 in more detail. The controller 116 is configured to acquire a raw image 204 of a scene via the image sensor 104. The controller 116 may be configured to load the raw image 204 in memory 202 of the camera 202. The controller 116 is further configured to generate a distortion corrected image 214 from the raw image 204, which may be based on the camera-specific optical center 118 of the camera 100 or other suitable calibration. The measured camera-specific optical center 118 or other calibration may be stored in the memory 202 (e.g., electrically erasable programmable read-only memory (EEPROM) or other nonvolatile memory) such that the camera-specific optical center 118 or other calibration may be made available for use in performing distortion correction operations. The measured camera-specific optical center 118 may be represented as (x, y) coordinates in a coordinate space of the image sensor 104. Due to lens distortion and/or alignment variances, the measured camera-specific optical center 118 may be offset from an actual center position of the image sensor 104. While use of optical center (OC) position data is not required to perform a distortion corrected image, the magnitude of effective distortion of the corrected image may increase with increase in OC deviation from the origin position used in the projection mapping. As an example, in some applications, small OC error, i.e. on order of <5-10 pixels, may provide sufficient accuracy, while other applications may utilize higher accuracy OC data. This implies that the accuracy of OC error achieved by the lens align and bond to image sensor PCB may help to inform level of need versus outcome. Note that inclusion of accurate OC position data may enable and maintain high quality correction for a wide range of OC errors, since the distortion correction mesh files (described below) are generated to compensate for OC.

The controller 116 may include a distortion correction machine 206 configured to translate pixel locations of pixels of the raw image 204 according to a distortion correction projection 212 comprising a tilt parameter to generate the distortion corrected image 214. In other examples distortion correction may be performed on another computing device, such as a computer receiving image data from the camera 100 (e.g. a computing device into which camera 100 is integrated), rather than on controller 116. Note that the pixel locations of different pixels in the raw image may be translated and/or interpolated, such as by application of a mesh grid (e.g. the mesh file referred to above) indicating mapping of each integer (x, y) pixel of a distortion corrected image to a floating-point position within the original input image (x', y'), on an individual pixel basis based on the distortion correction projection. As such, in different instances, pixel locations of different pixels may be translated differently (e.g., different direction and/or distance of translation for different pixels), pixel locations of different pixels may be translated the same (e.g., same direction and/or distance of translation for different pixels), and/or pixel locations of some pixels may remain the same between the raw image 204 and the distortion corrected image 214. Furthermore, distortion correction may include stretching and/or compressing portions of an image. Further still, for cases not equipped with a tilt sensor, the distortion-corrected image 214 may be analyzed by software (host) or firmware (embedded) to detect and locate line objects representing vertical objects in scene, i.e. corners of room walls, which expect to be vertical post distortion correction, and feed an adjustment of tilt angle back into the tilt sensor as input. Such iterative process thus utilizes scene content as feedback to determine correct tilt parameter, without the use of a tilt sensor.

More particularly, the distortion correction machine 206 may be configured to perform distortion correction mapping according to a distortion correction projection 212 comprising a pitch tilt parameter. The distortion correction machine 206 optionally may utilize the measured camera-specific optical center 118, image sensor parameters 208 and/or lens distortion parameters 210 as inputs. In one example, the image sensor parameters 208 may include a resolution of the image sensor 104 (e.g., a number of pixels included in the image sensor in both x and y dimensions) and a pixel size of pixels of the image sensor 104 (e.g., size of pixel in both x and y dimensions). In other examples, other image sensor parameters may be considered for the distortion correction projection 212. In one example, the lens distortion parameters 210 may include distortion data, such as image real height versus field angle of the lens 106. In other examples, other lens distortion parameters may be considered for the distortion correction projection 212. In some examples, a plurality of distortion correction projections 212 may be stored, e.g., corresponding to different tilt angles and/or different types of projections (e.g. cylindrical, spherical, and/or rectilinear). Further, in some examples, tilt angle data from a tilt sensor 213 may be used to select a distortion correction projection 212 to apply, such that the tilt angle of the projection corresponds to a tilt angle of the camera as determined from the tilt sensor data. The tilt sensor 213 may be incorporated into the camera or into a computing device comprising the camera, as examples. Further, tilt parameter may be provided by use of dedicated mechanical camera mount having a known tilt angle with reference to the lens optical axis. In yet other examples, the tilt angle may be provided as a user input, rather than determined from tilt sensor data. It should be noted that other geometric distortion correction projections not illustrated herein are envisioned to be compatible with tilted distortion correction, such as toroidal projection or hybrid projections such as upper portion cylindrical and lower portion toroidal or spherical, having transition at equatorial line. Further, the geometric distortion correction projection compatible with tilted distortion correction may include a parabolic profile along the vertical FOV which is radially swept, or curved, along the horizontal FOV.

The sensor parameters 208 and the lens distortion parameters 210 may be known a priori for the particular type of camera configuration that uses the lens 106 and the image sensor 104. For example, the sensor parameters 208 and the lens distortion parameters 210 may be the same for every camera in a particular manufacturing lot, whereas each camera of the particular manufacturing lot may have a different measured camera-specific optical center due to variations in manufacturing of the cameras. In some implementations, the sensor parameters 208 and lens distortion parameters 210 may be stored in memory 202, and in some implementations the sensor parameters 208 and lens distortion parameters may be hard coded into the distortion correction algorithm(s). Further, in some examples the mesh grid for interpolation of the distortion corrected image may be implemented as being oversized by an expected pixel tolerance of optical center variation (e.g., +/−50 pixels) for the manufacturing lot. The mesh grid may be cropped in firmware and/or software to match an output size based on a given offset for each camera case from stored optical center data. In other examples, the mesh grid for interpolation may be of the same size as the distortion corrected output image where the mesh grid is calculated once upon initialization of a camera based on the stored optical center data.

The distortion correction projection 212 defines a relationship between the pixel locations of the raw image 204 and the translated pixel locations of the distortion corrected image 214 as an inverse function in which the sensor coordinates are mapped to projection plane and/or surface coordinates of the distortion correction projection 212. As mentioned above, the distortion correction projection 212 comprises a tilt parameter based upon a pitch tilt angle of a camera.

Figure 3:
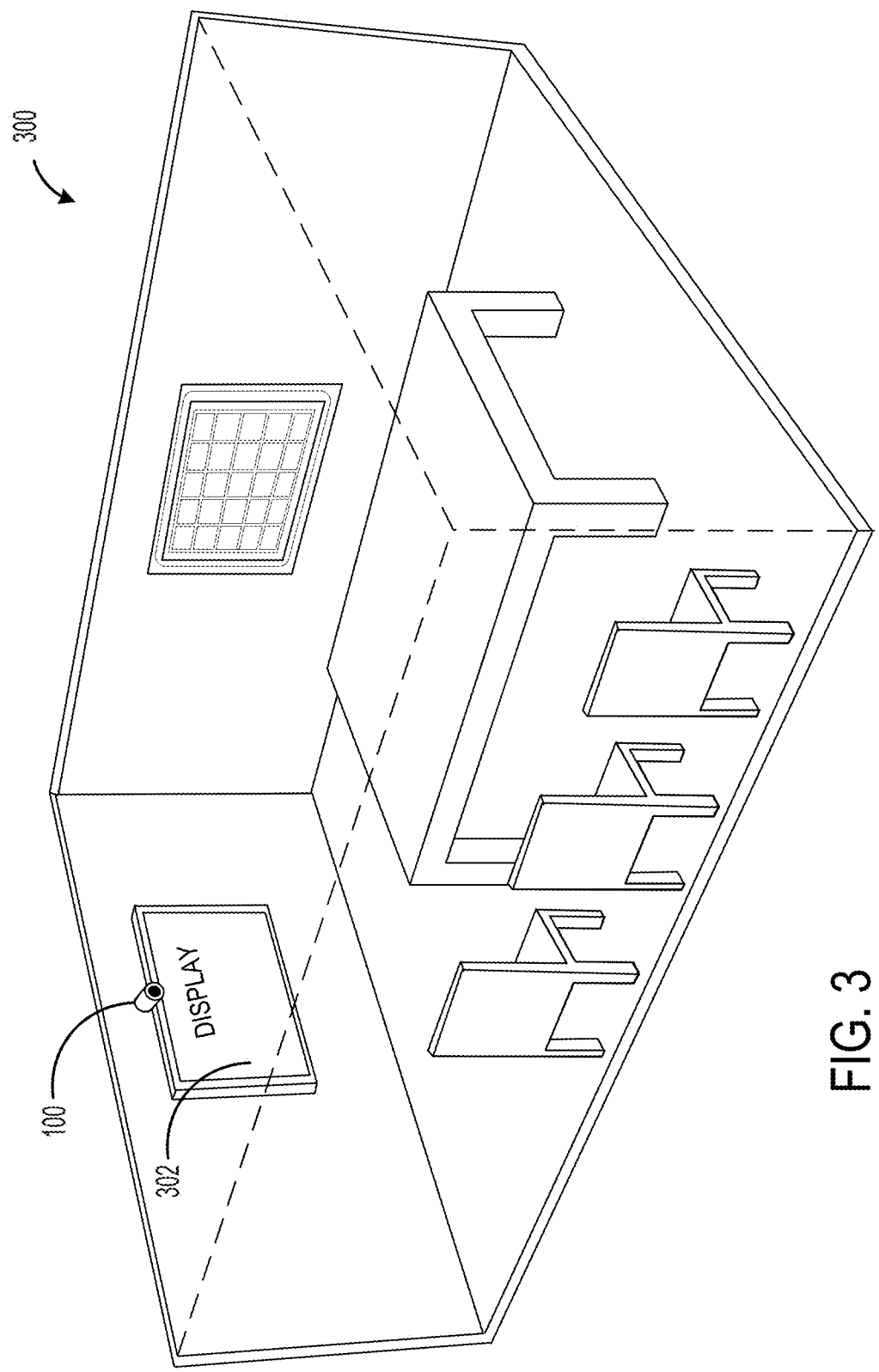
FIG. 3 shows an example conference room comprising a camera arranged with a downwardly tilted pitch angle.
Figure 4:
FIG. 4 shows an example uncorrected image acquired via a wide-angle camera having a downwardly tilted pitch angle.

FIG. 3 shows an example conference room 300 comprising a videoconferencing display and camera, in which camera 100 is placed to a side of display 302 with a downwardly tilted pitch angle. In FIG. 3, the camera 100 is located above the display 302, but may be located to a different side of the display 302 in other examples, including left, right or below in some examples. FIG. 4 shows an example raw image 400 acquired via a camera, equipped with a wide angle f-θ lens, having a similar placement in a room as that depicted in FIG. 1. Raw image 400 comprises a horizontal FOV (HFOV) of 145.5° and was acquired with a downward pitch tilt angle of 17 degrees from horizontal. As can be seen, objects at the sides of the image (e.g. subject 402) appear to be curved and warped. Further, objects closer to the center of the image appear to be unnaturally warped or compressed (e.g. subject 404 is compressed at the waist). Raw image 400 may not provide for a satisfactory conference room experience to remote participants due to the unnatural appearance of participants in the conference room images.

Figure 5:
FIG. 5 shows the image of FIG. 4 after application of a cylindrical projection mapping without a tilt parameter.

FIG. 5 shows an image 500 produced via application of an untilted cylindrical projection distortion correction to image 400. The cylindrical projection maps image sensor coordinates in image sensor space to cylindrical coordinates. Prior to this mapping, the pixel grid of the raw image is parameterized into corresponding physical dimensions, and may be shifted based on the measured camera-specific optical center to match the projection to the optical axis of the lens. In other examples, such shifting may be omitted, depending on a desired level of accuracy for an application.

Figure 6:
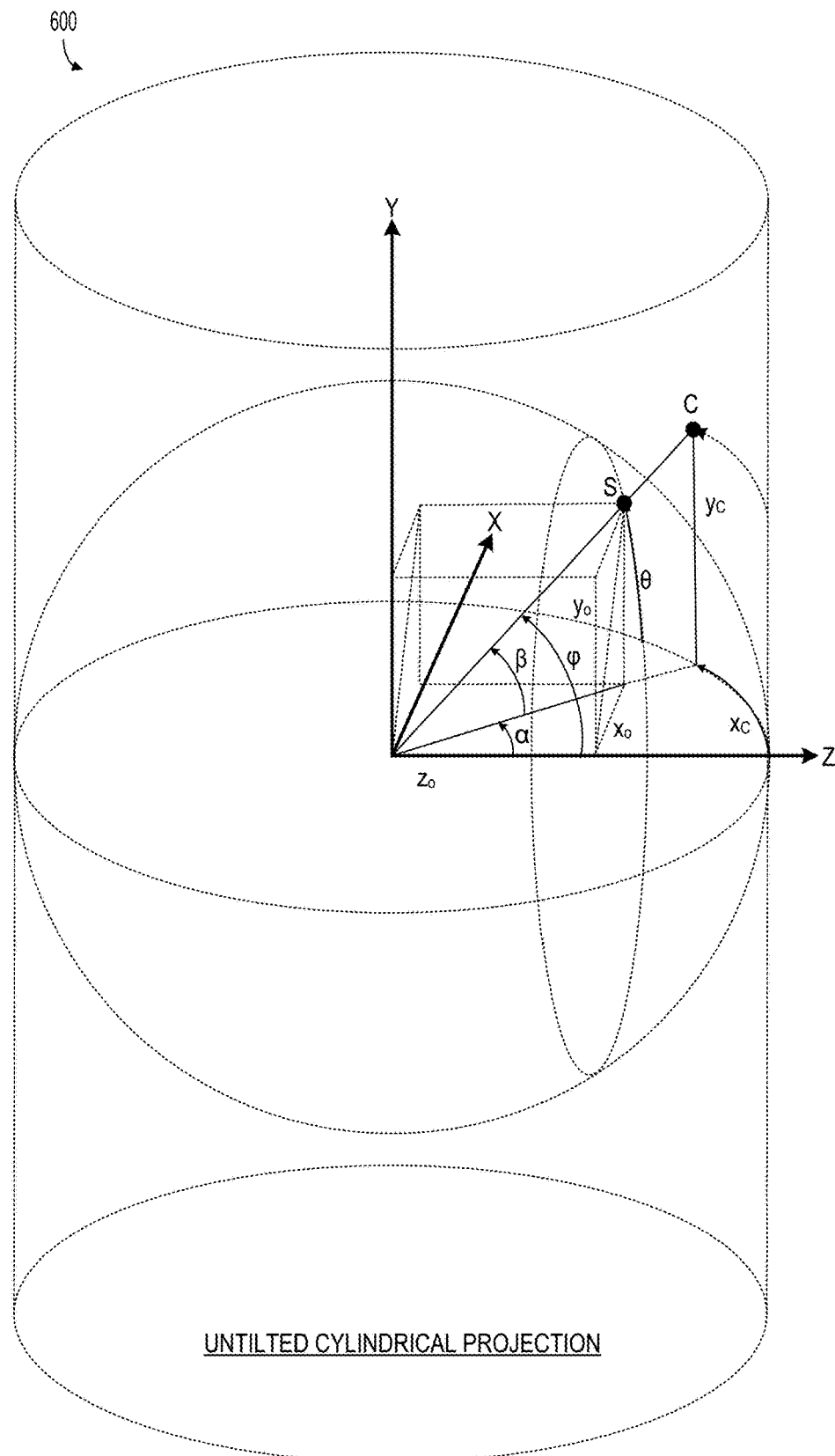
FIG. 6 shows a geometric representation of an example untilted cylindrical projection.

FIG. 6 shows a geometric representation of the untilted cylindrical projection 600 used to produce image 500, the image sensor coordinates are represented by (x, y) for the raw image. Projection radius $R_e$ may be used as a scaler for setting the field of view captured within the corrected image pixel positions. For example, for a field angle θ representing a real height $H_{Re}(\theta)$ of the horizontal edge of the image sensor, the corrected image may be set to subtend and include a target HFOV by setting $R_e$ as:

$$R_c = f\left(\frac{2\theta}{HFOV}\right)\left(\frac{H_{Re}(\theta)}{H_{Ref}(\theta)}\right).$$

The untilted cylindrical projection defines the relationship between the image sensor coordinates and the cylindrical coordinates (coordinates on the cylinder represented by the azimuth arclength $x_c$ and the height length $y_c$, thus positions in the corrected image) as an inverse function in the form of, $x(f, R_c, x_c, y_c)$ & $y(f, R_c, x_c, y_c)$, where $$\alpha = \frac{x_c}{R_c}, \beta = \tan^{-1}\left(\frac{y_c}{R_c}\right)$$

$$x_o = z_o\tan(\alpha) = z_o\tan\left(\frac{x_c}{R_c}\right) = \sqrt{1 - x_o^2 - y_o^2}\tan\left(\frac{x_c}{R_c}\right)$$

$$x_o = \sqrt{\frac{(1-y_o^2)\tan^2\left(\frac{x_c}{R_c}\right)}{\left(1+\tan^2\left(\frac{x_c}{R_c}\right)\right)}} =$$

$$\sqrt{\frac{(1-(\sin(\tan^{-1}(\frac{y_c}{R_c})))^2)\tan^2\left(\frac{x_c}{R_c}\right)}{(1+\tan^2\left(\frac{x_c}{R_c}\right))}} = \sqrt{\frac{R_c^2\sin^2\left(\frac{x_c}{R_c}\right)}{R_c^2+y_c^2}}$$

$$y_o = \sin(\beta) = \sin\left(\tan^{-1}\left(\frac{y_c}{R_c}\right)\right) = \frac{y_c}{R_c\sqrt{1+\frac{y_c^2}{R_c^2}}}$$

Radius $r_o$ may be determined as follows:

$$\sin(\varphi) = r_o = \sqrt{x_o^2 + y_o^2} = \sqrt{\frac{y_c^2 + R_c^2\sin^2\left(\frac{x_c}{R_C}\right)}{R_c^2 + y_c^2}}$$

-continued $$\text{Thus, for } \varphi: \varphi = \sin^{-1}(r_o) = \sin^{-1}\left(\sqrt{\frac{y_c^2 + R_c^2\sin^2\left(\frac{x_c}{R_c}\right)}{R_c^2 + y_c^2}}\right)$$

For unit radius, the factor c may define the ratio of $\varphi$ to $\sin(\varphi)$ as follows:

$$y = fcy_o, \; x = \text{sgn}(x_c)fcx_o, \text{ where } c = \frac{\varphi_D(\varphi)}{\sin(\varphi)}$$

with the distortion lookup table being defined as:

$$\varphi_D(\varphi) = LUT(\varphi) = \varphi\frac{H_{Re}(\varphi)}{H_{Ref}(\varphi)} \text{ or } c \sim \frac{\varphi\left(1 + \left(\frac{p_o\varphi^2}{\varphi_0^2}\right)\right)}{\sin(\varphi)}$$

for a percentage distortion $p_o$ at field angle $\varphi_o$ (rad).

In image 500, subject 402, while no longer curved and warped, appears to be leaning to the right. Similar distortions can be seen in other people and objects in the image. For example, the top edge of display 504 is curved, giving display 504 a warped appearance. Likewise, the white boards on either side of the conference room (e.g. white board 506) also appear to be tilted outwardly. Thus, while the participants and other objects look more natural than in the uncorrected image, the distortion that is present still may provide for an unsatisfactory experience for remote participants.

Figure 7:
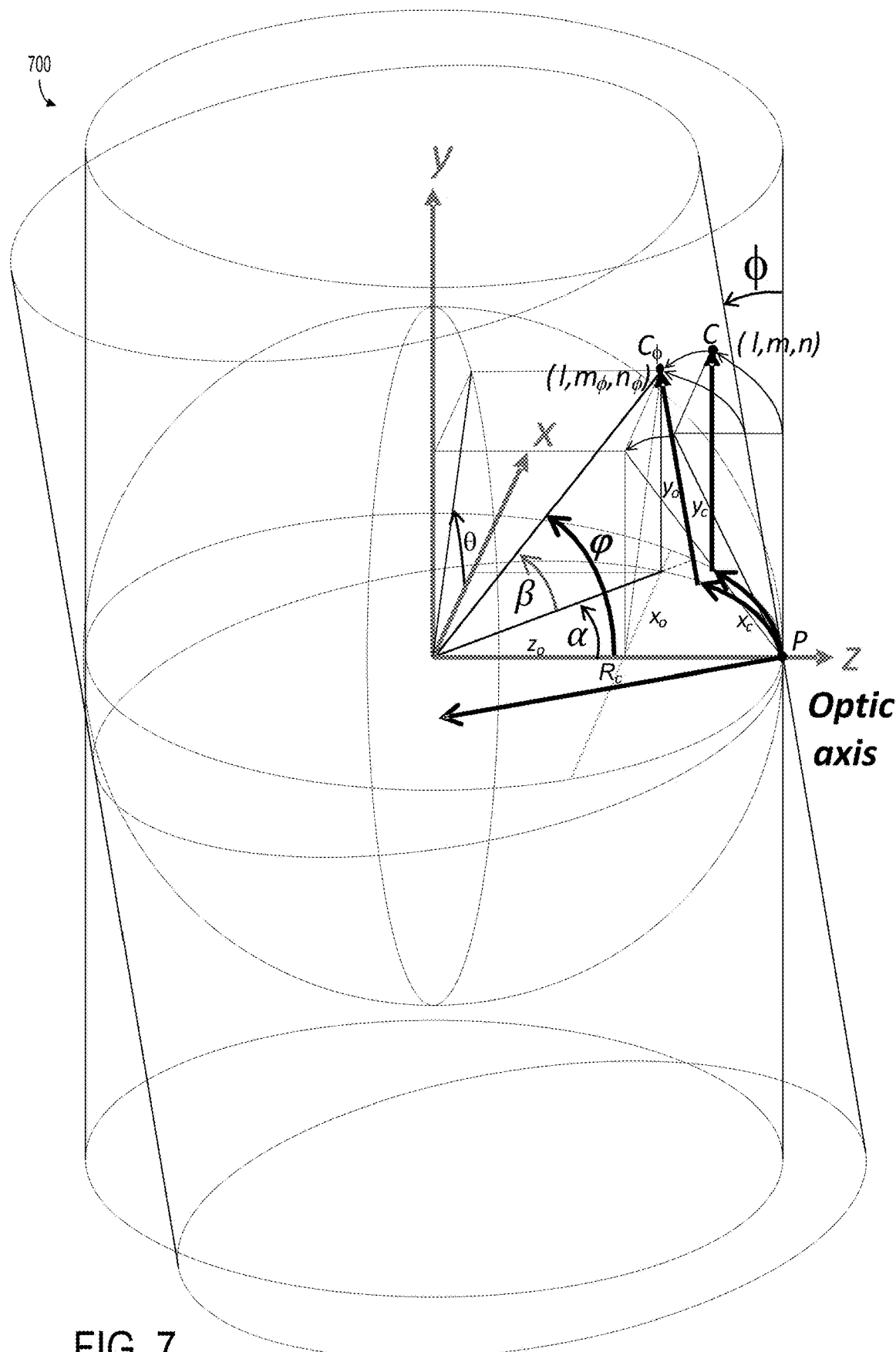
FIG. 7 shows a geometric representation of an example tilted cylindrical projection.

Thus, as mentioned above, to avoid the appearance of outward leaning objects in an image, a tilt parameter can be incorporated into a projection mapping for image distortion correction. FIG. 7 shows a geometric depiction of an example tilted cylindrical distortion correction projection 700. The tilted cylindrical projection 700 maps image sensor coordinates in image sensor space to cylindrical coordinates of the tilted cylinder to generate a corrected image from a raw image. The image sensor coordinates are represented by (x, y) for the raw image. Projection radius $R_c$ may be used as a scaler for setting the field of view captured within the corrected image pixel positions. For example, for a field angle representing a real height $H_{Re}(\theta)$ of the horizontal edge of the image sensor, the corrected image may be set to subtend and include a target HFOV by setting $R_e$ as:

$$R_c = f\left(\frac{1}{\cos(\phi)}\right)\left(\frac{2\theta}{HFOV}\right)\left(\frac{H_{Re}(\theta)}{H_{Ref}(\theta)}\right).$$

The cylindrical projection defines the relationship between the image sensor coordinates and the cylindrical coordinates (coordinates on the tilted cylinder represented by the azimuth arclength $x_c$ and the height length $y_c$ all points which have been rotated by tilt angle $\phi$ about point P within YZ plane, which correspond to positions in the corrected image) as an inverse function in the form of $x(f, R_c, x_c, y_c, \phi)$ $y(f, R_c, x_c, y_c, \phi)$.

For a given tilt angle $\phi$, the lateral position $x_o$ remains constant for a given $(x_c, y_c)$, however, $y_o$ and $z_o$ are dependent on radial shift of point $C=(l, m, n)$ to $C_\phi=(l_\phi, m_\phi, n_\phi)$ within the yz plane. Here, the coordinates $(x_o, y_o, z_o)$ are the Cartesian coordinates of the shifted point $C_\phi$ with respect to the origin (i.e., in the frame of reference of the camera located at the center of the untilted cylinder). The coordinates $(x_c, y_c, z_c)$ are the cylindrical coordinates of point C with respect to the origin, equivalent to the cylindrical coordinates of shifted point $C_\phi$ with respect to the center of the tilted cylinder. The coordinates (l, m, n) are Cartesian coordinates with respect to the pivot point P of the cylinder, which is located a distance $R_c$ from the origin of the camera frame of reference. First determine $\Delta y_o(x_c, y_c, \phi)$ and $\Delta z_o(x_c, y_c, \phi)$ corresponding to the radial shift of point C:

$$\alpha_c = \frac{x_c}{R_c}, \; \beta_c = \tan^{-1}\left(\frac{y_c}{R_c}\right)$$

$$l = R_c\sin\left(\frac{x_c}{R_c}\right)$$

$$m = y_c$$

$$n = R_c - \sqrt{R_c^2 - \left(R_c\sin\left(\frac{x_c}{R_c}\right)\right)^2}$$

$$\alpha_c = \tan^{-1}\left(\frac{x_o}{z_o}\right) \; \beta_c = \tan^{-1}\left(\frac{y_o}{r_{xz}}\right) \text{ where } r_{xz} = \sqrt{x_o^2 + z_o^2}$$

For $(x_o, y_o, z_o)$:

$$x_o = R_c\sin\left(\frac{x_c}{R_c}\right)$$

$$y_o = m_\phi = n\sin\phi + m\cos\phi = \left(R_c - \sqrt{R_c^2 - \left(R_c\sin\left(\frac{x_c}{R_c}\right)\right)^2}\right)\sin\phi + y_c\cos\phi$$

$$z_o = R_c - n_\phi =$$

$$R_c - n\cos\phi + m\sin\phi = R_c - \left[\left(R_c - \sqrt{R_c^2 - \left(R_c\sin\left(\frac{x_c}{R_c}\right)\right)^2}\right)\cos\phi - y_c\sin\phi\right]$$

For Field Angles $\varphi$, we have relation with radius $r_o$:

$$\sin(\varphi) = \frac{\sqrt{x_o^2 + y_o^2}}{r_o}$$

Thus, for Field Angles $\varphi$, since $r_o = \sqrt{x_o^2 + y_o^2 + z_o^2}$, $$\varphi = \sin^{-1}\left(\frac{\sqrt{x_o^2 + y_o^2}}{\sqrt{x_o^2 + y_o^2 + z_o^2}}\right)$$

Now, x and y positions on sensor plane, from projection origin at optical axis, representing $x_c$ and $y_c$ positions on cylinder rotated by tilt angle $\phi$, may be defined as:

$$y = f\varphi_D(\varphi)\left(\frac{y_o}{\sqrt{x_o^2 + y_o^2}}\right), \; x = f\varphi_D(\varphi)\left(\frac{x_o}{\sqrt{x_o^2 + y_o^2}}\right),$$

with the distortion lookup table being defined as:

$$\varphi_D(\varphi) = LUT(\varphi) = \varphi\frac{H_{Re}(\varphi)}{H_{Ref}(\varphi)} \text{ or } \varphi_D(\varphi) \sim \varphi\left(1 + \left(\frac{p_o\varphi^2}{\varphi_o^2}\right)\right)$$

for a percentage distortion $p_o$ at field angle $\varphi_o$(rad).

Figure 8:
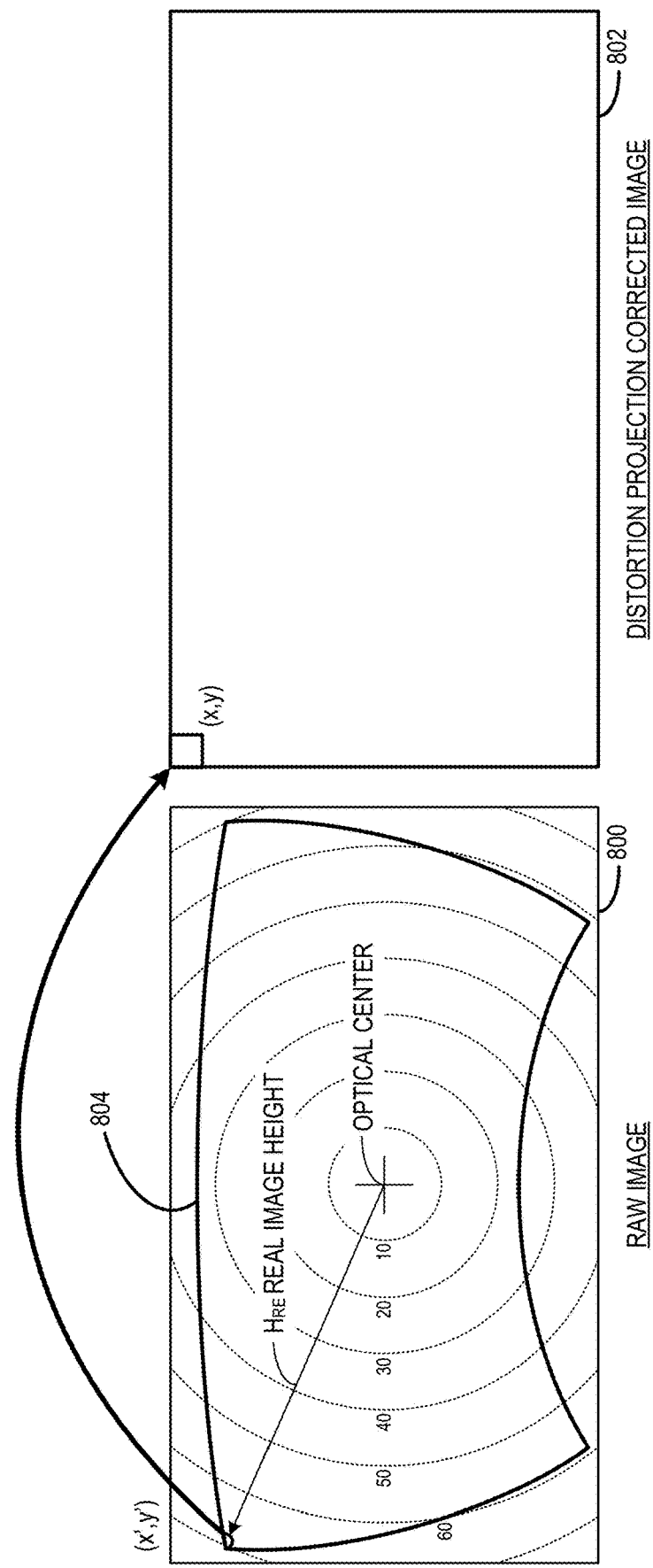
FIG. 8 schematically shows an example mapping of a pixel location in a raw image to a pixel location in a corrected image.

The distortion correction projection may be precomputed and stored as a pixel mapping function (a mesh file) that is applied to pixels in the raw image to produce the distortion corrected image FIG. 8 shows an example raw image 800 and an example distortion corrected image 802. The raw image 800 includes contours in the form of concentric circles that represent the field angle (in degrees) of a lens. In the illustrated example, the contours represent 10-degree increments from 0 degrees to 90 degrees. An outline 804 in the raw image 800 represents frame edges of the distortion corrected image 802. In the illustrated example, the raw image 800 is generated by a camera supporting ~137 degrees of HFOV with a spherical or cylindrical projection. In other examples, instead of being pre-computed, the distortion correction projection may be computed during use.

Figure 9:
FIG. 9 shows the image of FIG. 4 after application of a cylindrical projection mapping comprising a tilt parameter.

FIG. 9 shows a corrected image 900 obtained by applying a tilted cylindrical projection correction to image 400. In corrected image 900, subject 402 no longer appears to be warped as in the raw image 400, or leaning as in the image 500 corrected via the untilted cylindrical projection, but instead appears both undistorted and vertically oriented. Further, the whiteboards (e.g. whiteboard 506) along the sides of the room also appear vertically oriented, and the upper edge of display 504 appears to be straight instead of curved. Further, subject 404 no longer appears to be narrowed in a lower portion of the image. As such, corrected image 900 may provide for a more satisfactory experience for remote meeting participants, giving the participants more of a feeling of "being there" at the meeting due to the more natural appearances and orientations of the users and other objects in the room.

As mentioned above, in some examples, a camera may be configured to be used with multiple different pitch angles. For example, a camera may have a pivoting joint at which a camera body attaches to a mount. For a camera incorporated into the body of a device (e.g. a camera positioned in a bezel of a display), the device, or a mount for the device, may include a similar joint. Likewise, a device incorporating a camera, such as a display, may have different pitch angles when mounted to a stand compared to a wall. Thus, to allow appropriate tilted projections to be applied, the camera or device incorporating the camera also may include a tilt sensor (e.g. an inertial motion sensor, rotational encoder incorporated into the pivot joint, etc.) to allow sensing of a pitch tilt angle. In some examples, required tilt angle parameter may correlate one-to-one with the mount of a specific device, such that the camera may detect tilt angle based on communication with that device, or that specific mount on such device, via communication connectivity with the device at the mount. Based upon a sensed pitch tilt angle, a corresponding projection mapping may be applied to correct images acquired at the sensed tilt angle.

In some examples, the tilt distortion correction projection may be precomputed for each of a plurality of pitch angles. For example, the pixel mappings for a tilt distortion correction may be computed at each integer degree between 0° and 30°. In other examples, the tilt distortion correction may be computed at each half-degree. In yet other examples, pixel mappings may be computed for any other suitable angular ranges and/or increments, and angular range may include positive or negative tilt angles. In further examples, the tilt distortion mapping may be computed during use, e.g. in real time.

Figure 10:
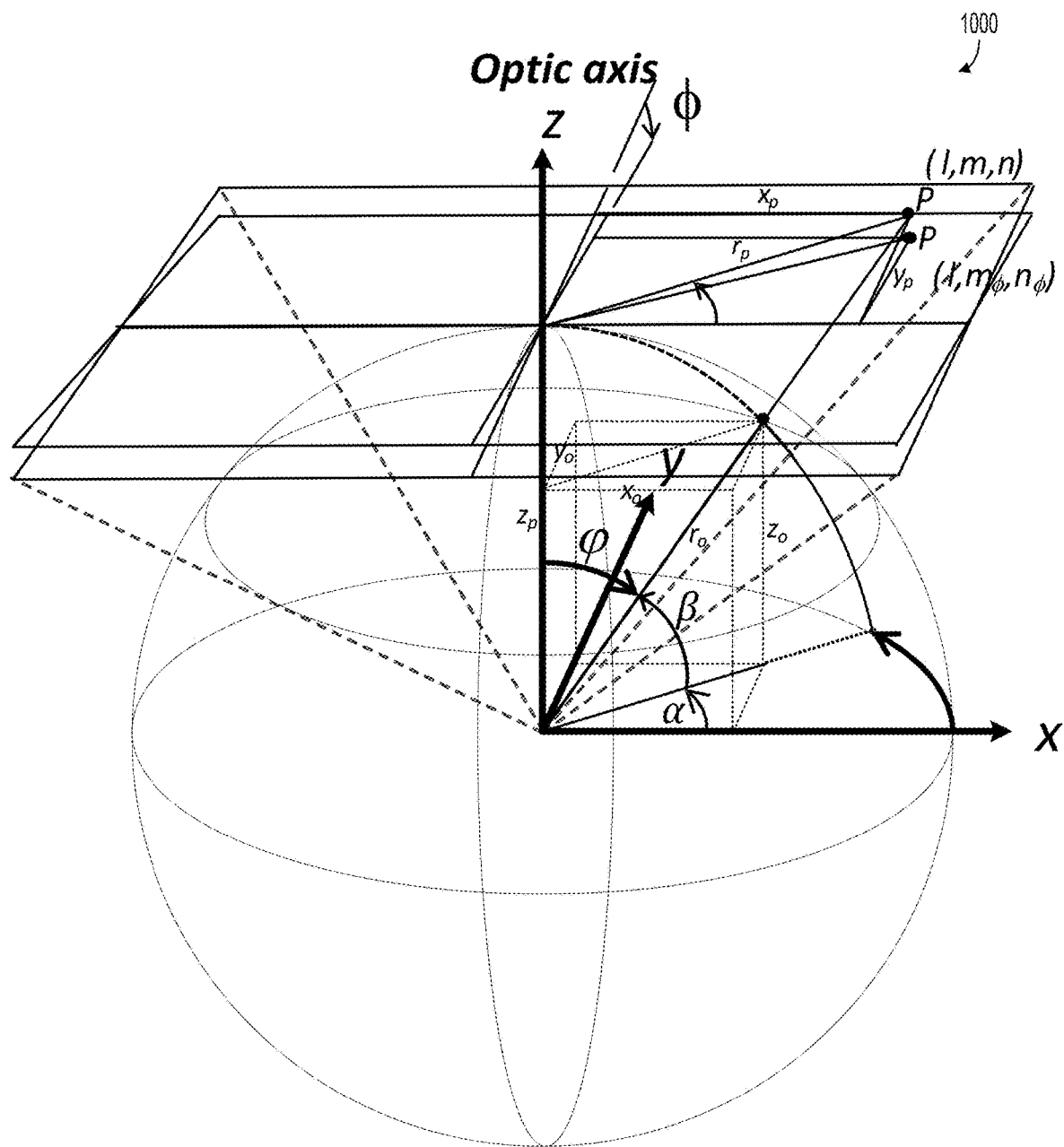
FIG. 10 shows a geometric representation of an example tilted rectilinear projection.

In the examples above, a tilted cylindrical projection is used for distortion correction. In other examples, other projections comprising tilt parameters may be used. FIG. 10 shows a geometric representation of an example tilted rectilinear distortion correction projection 1000 for pitch tilt angle ϕ. The tilted rectilinear projection maps image sensor coordinates in image sensor space to projection plane coordinates of a tilted rectilinear projection plane. Prior to this mapping, the pixel grid of the raw image is parameterized into corresponding physical dimensions and optionally may be shifted based on the measured camera-specific optical center.

The image sensor coordinates are represented by $(x_s, y_s)$ for the raw image. Projection distance $z_p$ may be used as a scaler for setting the field of view captured within the corrected image pixel positions. For example, for a real height $H_{Re}$ of the horizontal edge of the image sensor, the corrected image may be set to subtend and include a target horizontal field of view (HFOV) by setting $z_p$ as:

$$z_p = \left(\frac{1}{\cos(\phi)}\right)\left(\frac{H_{Re}}{\tan\left(\left(\frac{\pi}{180}\right)\left(\frac{HFOV}{2}\right)\right)}\right).$$

The tilted rectilinear projection defines the relationship between the image sensor coordinates and the projection plane coordinates (coordinates on the plane represented by position $(x_p, y_p)$, all points which have been rotated by tilt angle ϕ about a point located a distance $z_p$ along z axis, thus positions in the corrected image) as an inverse function in the form of, $x_s(f, x_p, y_p, z_p, \phi)$ & $y_s(f, x_p, y_p, z_p, \phi)$.

For a point P=(l, m, n) on the untilted plane, relative to the pivot point along z axis, $l=x_p$, $m=y_p$, and n=0. For a given tilt angle ϕ, the lateral position $x_o$ remains constant. Including tilt ϕ of the plane, point P moves to $P_\phi=(l_\phi, m_\phi, n_\phi)$, where $l_\phi=x_p$, $m_\phi=n \sin \phi + m \cos \phi = y_p \cos \phi$, and $n_\phi = n \cos \phi - m \sin \phi = -y_p \sin \phi$, thus coordinates with respect to XYZ origin become $x_o = l = x_p,$ $y_o = m_\phi = m \cos \phi = y_p \cos \phi,$ and $z_o = z_p - n_\phi = z_p - (-m \sin \phi) = z_p + y_p \sin \phi.$ $$\varphi = \sin^{-1}\left(\frac{\sqrt{x_o^2 + y_o^2}}{\sqrt{x_o^2 + y_o^2 + z_o^2}}\right)$$

Given $(x_o, y_o, z_o)$ above, the Field Angles are expressed as: while $r_p = \sqrt{x_p^2 + y_p^2}$ and $z_p$=distance scaler to plane.

For the projection plane coordinates $(x_p, y_p)$:

$$x_p = r_p \cos(\theta) \text{ where } \cos(\theta) = \frac{x_p}{r_p} = \frac{x_p}{\sqrt{x_p^2 + y_p^2}}$$

$$y_p = r_p \sin(\theta) \text{ where } \sin(\theta) = \frac{y_p}{r_p} = \frac{y_p}{\sqrt{x_p^2 + y_p^2}}$$

The radius $r_s$ on the image sensor from an angle to the image height may be represented as a function: $r_s(\varphi)$. For example, this relationship may be determined via a distortion lookup table which may be used to interpolate a radial image height for any given field angle, a fit equation, or estimated with a parabolic percentage (p) distortion from a f-θ at Field Angle. The radius $r_s$ may be determined as follows:

$$r_s(\varphi) = f\varphi_D(\varphi) \sim f\left(\varphi + \frac{p\varphi^3}{\varphi_o^2}\right)$$

For Field Angles φ in radians $$\varphi = \sin^{-1}\left(\frac{\sqrt{x_o^2 + y_o^2}}{\sqrt{x_o^2 + y_o^2 + z_o^2}}\right)$$

The distortion lookup table may be defined as follows:

$$\varphi_D(\varphi) = LUT(\varphi) = \varphi \frac{H_{Re}(\varphi)}{H_{Ref}(\varphi)}$$

For the sensor coordinates $(x_s, y_s)$, including rotation due to tilt angle φ:

$$y_s = f\varphi_D(\varphi)\left(\frac{y_0}{\sqrt{x_0^2 + y_0^2}}\right) \sim f\left(\varphi + \frac{p\varphi^3}{\varphi_o^2}\right)\left(\frac{y_0}{\sqrt{x_0^2 + y_0^2}}\right)$$

$$x_s = f\varphi_D(\varphi)\left(\frac{x_0}{\sqrt{x_0^2 + y_0^2}}\right) \sim f\left(\varphi + \frac{p\varphi^3}{\varphi_o^2}\right)\left(\frac{x_0}{\sqrt{x_0^2 + y_0^2}}\right)$$

Figure 11:
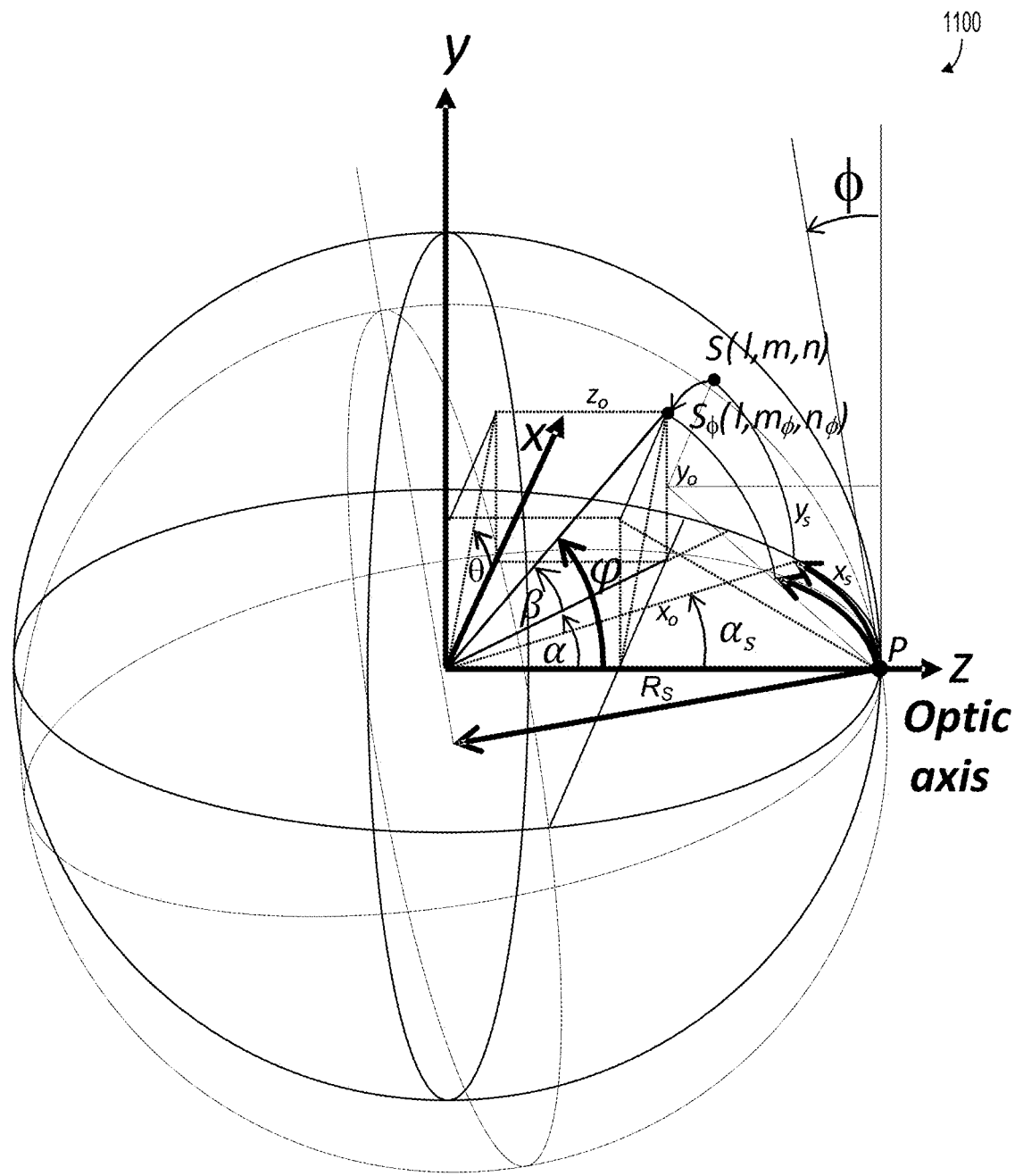
FIG. 11 shows a geometric representation of an example tilted spherical distortion projection.

FIG. 11 schematically shows an example tilted spherical distortion correction projection 1100. The tilted spherical projection maps image sensor coordinates in image sensor space to spherical coordinates. Projection radius $R_s$ may be used as a scaler for setting the field of view captured within the corrected image pixel positions. For example, for a field angle θ representing a real height $H_{Re}(\theta)$ of the horizontal edge of the image sensor, the corrected image may be set to subtend and include a target HFOV by setting $R_s$ as:

$$R_s = f\left(\frac{1}{\cos(\phi)}\right)\left(\frac{2\theta}{HFOV}\right)\left(\frac{H_{Re}(\varphi)}{H_{Ref}(\varphi)}\right).$$

The spherical projection defines the relationship between the image sensor coordinates and the spherical coordinates (coordinates on the sphere represented by the azimuth arclength $x_s$ and the elevation arclength $y_s$, all points which have been rotated by tilt angle φ about point P within YZ plane, which correspond to positions in the corrected image) as an inverse function in the form of, $x(f, x_s, y_s, R_s, \phi)$ & $y(f, x_s, y_s, R_s, \theta)$.

For a given tilt angle φ, the lateral position $x_o$ remains constant for a given $(x_s, y_s)$, however, $y_o$ and $z_o$ are dependent on radial shift of point $S=(l, m, n)$ to $S_\phi=(l_\phi, m_\phi, n_\phi)$ within the yz plane. Here, the coordinates $S=(l, m, n)$ are Cartesian coordinates in the frame of reference of pivot point P, a distance $R_s$ from the origin of the frame of reference of the camera. First determine $\Delta y_o(x_s, y_s, \phi)$ and $\Delta z_o(x_s, y_s, \phi)$:

$$\alpha_s = \frac{x_s}{R_s}, \beta_s = \left(\frac{y_s}{R_s}\right),$$

$$n = R_s - \sqrt{R_s^2 - \left(\sqrt{l^2 + m^2}\right)^2} = R_s - l^2 - m^2$$

-continued $$l = R_s \sin\left(\frac{x_s}{R_s}\right)\cos\left(\frac{y_s}{R_s}\right)$$

$$m = R_s \sin\left(\frac{x_s}{R_s}\right)$$

$$n = R_s - R_s \cos\left(\frac{x_s}{R_s}\right)\cos\left(\frac{y_s}{R_s}\right)$$

$$\alpha = \tan^{-1}\left(\frac{X_o}{Z_o}\right) \beta = \tan^{-1}\left(\frac{y_o}{r_{xz}}\right) \text{ where } r_{xz} = \sqrt{x_o^2 + z_o^2}$$

For $(x_o, y_o, z_o)$:

$$x_o = R_s \sin\left(\frac{x_s}{R_s}\right)\cos\left(\frac{y_s}{R_s}\right)$$

$$y_o = m_\phi = n\sin\phi + m\cos\phi$$

$$y_o = \left(R_s - R_s\cos\left(\frac{x_s}{R_s}\right)\cos\left(\frac{y_s}{R_s}\right)\right)\sin\phi + R_s\left(\frac{y_s}{R_s}\right)\cos\phi$$

$$z_o = R_s - n_\phi = R_s - n\cos\phi + m\sin\phi$$

$$z_o = R_s - \left[\left(R_s - R_s\cos\left(\frac{x_s}{R_s}\right)\cos\left(\frac{y_s}{R_s}\right)\right)\cos\phi - R_s\sin\left(\frac{y_s}{R_s}\right)\sin\phi\right]$$

For Field Angles φ, we have relation with radius $r_o$, and since $r_0=\sqrt{x_o^2+y_o^2+z_o^2}$:

$$\sin(\varphi) = \frac{\sqrt{x_o^2 + y_o^2}}{r_o} = \frac{\sqrt{x_o^2 + y_o^2}}{\sqrt{x_o^2 + y_o^2 + z_o^2}}$$

Thus, for Field Angles φ:

$$\varphi = \sin^{-1}\left(\frac{\sqrt{x_o^2 + y_o^2}}{\sqrt{x_o^2 + y_o^2 + z_o^2}}\right)$$

Now, x and y positions on sensor plane, from projection origin at optical axis, representing $x_s$ and $y_s$ positions on sphere rotated by tilt angle φ, may be defined as:

$$y = f\varphi_D(\varphi)\left(\frac{y_o}{\sqrt{x_o^2 + y_o^2}}\right), x = f\varphi_D(\varphi)\left(\frac{x_o}{\sqrt{x_o^2 + y_o^2}}\right),$$

with the distortion lookup table being defined as:

$$\varphi_D(\varphi) = LUT(\varphi) = \varphi\frac{H_{Re}(\varphi)}{H_{Ref}(\varphi)} \text{ or } \varphi_D(\varphi) \sim \varphi\left(1 + \left(\frac{p_o\varphi^2}{\varphi_o^2}\right)\right)$$

for a percentage distortion $p_o$ at field angle $\varphi_o$ (rad).

Figure 12:
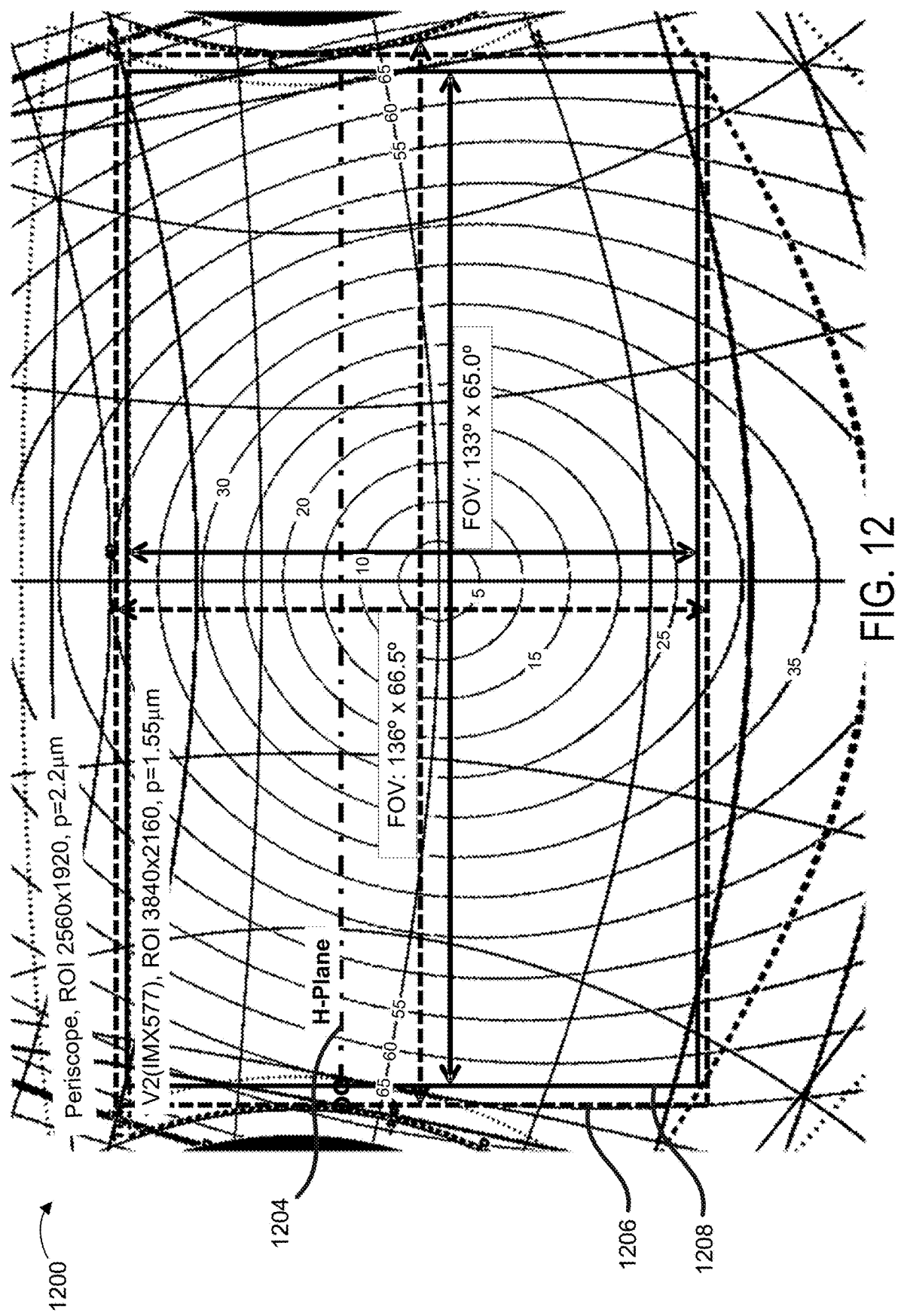
FIG. 12 shows a schematic representation of the field of view of a cropped undistorted image.

Applying the tilt distortion correction projections as disclosed herein may allow an image to be cropped to remove any void areas at the sides resulting from the correction while retaining a significant horizontal field of view (HFOV) in the corrected image. FIG. 12 shows an example projection mapping of f-θ lens field angle lines onto a corrected image using a tilted cylindrical distortion correction projection. In this example, the camera pitch angle is 12° as seen by the position of the horizontal H-Plane 1204 relative to the f-θ lens optical center. In this example the original raw image comprises a HFOV of 145.5° while the corrected cropped portion 1206 comprises a HFOV of 136° and a vertical FOV (VFOV) of 66.5°. In some examples, the image may be further cropped to a HFOV of 133° and a VFOV of 65.0° as seen in corrected cropped portion 1208. In some examples, the raw image may be captured with a camera comprising a 2560×1920 pixel image sensor comprising pixel dimensions of ~2.2 μm. In other examples, the raw image may be captured with a high-resolution 4K camera comprising a 3840×2160 pixel image sensor comprising pixel dimensions of ~1.85 μm. In some examples, the raw image may be captured as a 4K (16:9) ROI of a 12 MP (4:3) image sensor. In some examples the final corrected image may comprise a 16:9 aspect ratio. In other examples the corrected image may comprise a 4:3 aspect ratio. In other examples, the HFOV and VFOV after applying a correction may have any other suitable values.

Figure 13:
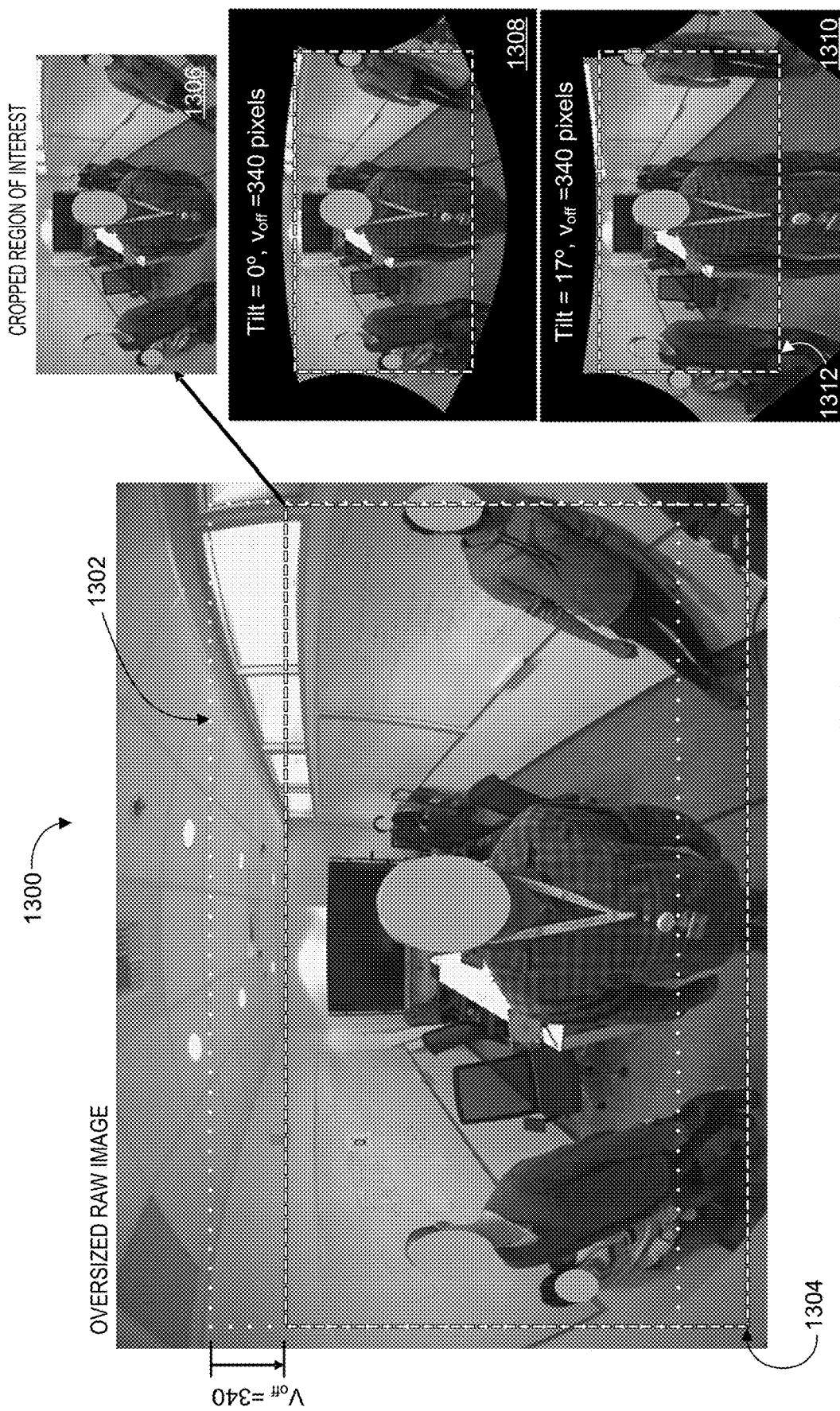
FIG. 13 schematically shows an example of cropping a raw image prior to the application of a tilted cylindrical distortion projection.

In some examples, the raw image may be cropped prior to applying the tilt projection mapping, such as where an oversized sensor is used to help account for OC error while maintaining consistency of the camera FOV pointing from camera-to-camera across a population of devices. FIG. 13 shows an example oversized raw image 1300 of a conference room scene captured with a camera downwardly tilted at a pitch angle of 17°. As one example, oversized raw image 1300 may be cropped at the center using cropping region 1302. As another example, oversized raw image 1300 may be cropped using cropping region vertically offset from the center, to thereby crop the image to a vertically offset region of interest. In this example, cropping region 1304 is vertically offset 340 pixels downwards to capture raw region of interest 1306. Corrected image 1308 represents the untilted cylindrical distortion correction applied to cropped region of interest 1306. Corrected image 1310 represents the tilted cylindrical distortion correction applied to cropped region of interest 1306 using a tilt angle of 17°. Corrected image 1310 may be further cropped via cropping region 1312 to yield a corrected image for presentation to a user. A combination of camera pointing angle, or camera pitch, and vertical offset may be used to achieve a vertical bias in the captured image that is greater than either the camera pitch angle or the bias due to vertical offset of ROI, such that the camera may appear to be placed pointing at a downward tilt angle more subtle in appearance than the angular downward bias angle that it is capable of capturing, thus providing some freedom for industrial design regarding the physical appearance of the camera in application, while being capable of similar scene capture function for a variety of pitch angles.

Figure 14:
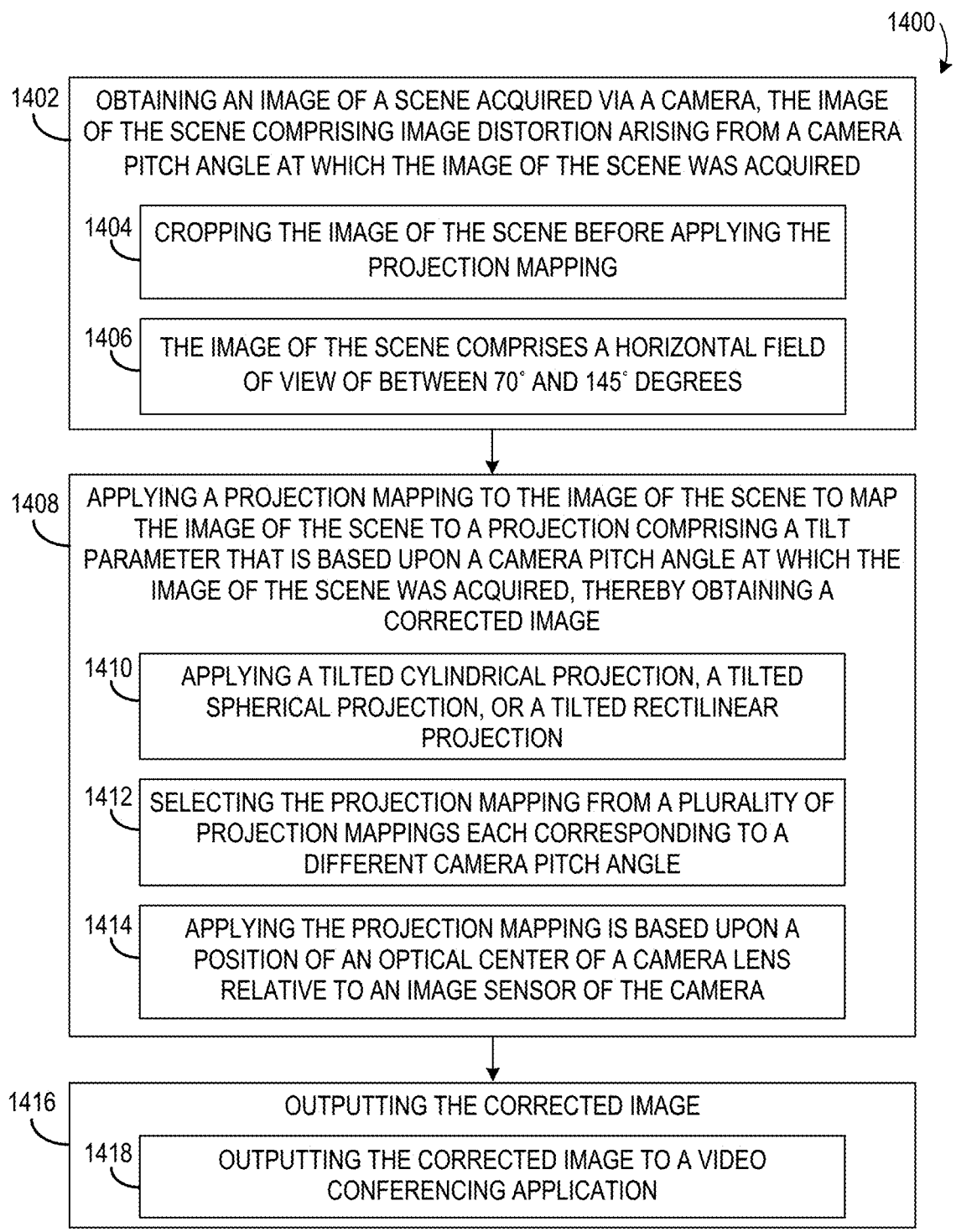
FIG. 14 is a flow diagram depicting an example method for correcting tilt distortion in an image.

FIG. 14 shows a flow diagram depicting an example method 1400 for correcting tilt distortion in an image acquired from a camera having a pitch tilt angle. For example, the method 1400 may be performed by the controller 116 of the camera 100 shown in FIG. 1, or on a computing device that receives image data from the camera 100. At 1402, the method 1400 includes obtaining an image of a scene acquired via a camera. The image of the scene comprises image distortion arising from a camera pitch angle at which the image of the scene was acquired. In some implementations, at 1404, the method 1400 optionally may include cropping the image of the scene before applying the projection mapping. For example, the image of the scene may be cropped with a vertical offset as similar to cropping region 1304. In some implementations, at 1406, the method 1400 may optionally include acquiring an image of a scene comprising a horizontal field of view of between 70° and 145° degrees. In other implementations, the method 1400 may optionally include acquiring an image of a scene comprising a horizontal field of view of up to or even greater than 180°. For example, rectilinear projections may be used for corrections of up to 180 degrees (although <120 deg may be more practical for many biometric applications when considering on-axis angular pixel density drops substantially for higher FOV using rectilinear projection), while cylindrical & spherical projections may be applied to angles greater than 180 degrees, e.g. using fisheye lenses. As described above, image distortion may be more severe in such wide- and ultra-wide angle ranges than at lower angle ranges.

At 1408, method 1400 includes applying a projection mapping to the image of the scene to map the image of the scene to a projection comprising a tilt parameter that is based upon a camera pitch angle at which the image of the scene was acquired, thereby obtaining a corrected image. In some implementations, at 1410, method 1400 optionally may include applying one of a tilted cylindrical projection 700, a tilted rectilinear projection 1000, or a tilted spherical projection 1100. In some implementations, at 1412, method 1400 optionally may include selecting the projection mapping from a plurality of projection mappings each corresponding to a different camera pitch angle. For example, the plurality of projection mappings may be stored in a table indexed by the tilt parameter of the projection. In some implementations, at 1414, method 1400 optionally may include applying the projection mapping based upon a position of an optical center of a camera lens relative to an image sensor of the camera. For example, the camera acquiring the image of a scene at 1402 may comprise an image sensor and a camera lens with optical center offset relative to the image sensor. In this example, method 1400 may apply the projection based on this offset.

At 1416, method 1400 includes outputting the image. In some implementations, at 1418, method 1400 optionally may include outputting the image to a videoconferencing application, or to any other suitable application.

In some embodiments, the methods and processes described herein may be tied to a computing system of one or more computing devices. In particular, such methods and processes may be implemented as a computer-application program or service, an application-programming interface (API), a library, and/or other computer-program product.

Figure 15:
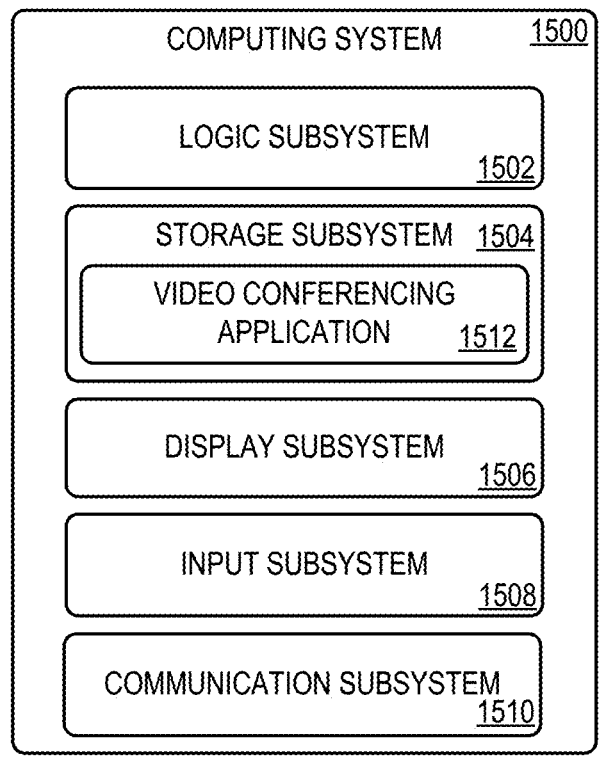
FIG. 15 schematically shows an example computing system.

FIG. 15 schematically shows a non-limiting embodiment of a computing system 1500 that can enact one or more of the methods and processes described above. Computing system 1500 is shown in simplified form. Computing system 1500 may take the form of one or more personal computers, server computers, tablet computers, home-entertainment computers, network computing devices, gaming devices, mobile computing devices, mobile communication devices (e.g., smart phone), and/or other computing devices. For example, computing device 1500 may represent controller 116, camera 100, a computing device incorporating camera 100 (e.g. a videoconferencing system having an integrated camera), or any other suitable computing system.

Computing system 1500 includes a logic subsystem 1502 and a storage subsystem 1504. Computing system 1500 may optionally include a display subsystem 1506, input subsystem 1508, communication subsystem 1510, and/or other components not shown in FIG. 15.

Logic subsystem 1502 includes one or more physical devices configured to execute instructions. For example, the logic subsystem may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic subsystem may include one or more processors configured to execute software instructions. Additionally or alternatively, the logic subsystem may include one or more hardware or firmware logic subsystems configured to execute hardware or firmware instructions. Processors of the logic subsystem may be single-core or multi-core, and the instructions executed thereon may be configured for sequential, parallel, and/or distributed processing. Individual components of the logic subsystem optionally may be distributed among two or more separate devices, which may be remotely located and/or configured for coordinated processing. Aspects of the logic subsystem may be virtualized and executed by remotely accessible, networked computing devices configured in a cloud-computing configuration.

Storage subsystem 1504 includes one or more physical storage devices configured to hold instructions executable by the logic subsystem to implement the methods and processes described herein. When such methods and processes are implemented, the state of storage subsystem 1504 may be transformed—e.g., to hold different data. For example, the storage subsystem 1504 may store instructions executable to apply distortion corrections as described above. Further, the storage subsystem 1504 may store applications executable by the logic subsystem 1502 such as a videoconferencing application 1512 that receives distortion-corrected images for transmission and/or display.

Storage subsystem 1504 may include removable and/or built-in devices. Storage subsystem 1504 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage subsystem 1504 may include volatile, nonvolatile, dynamic, static, read/write, read-only, random-access, sequential-access, location-addressable, file-addressable, and/or content-addressable devices.

It will be appreciated that storage subsystem 1504 includes one or more physical devices. However, aspects of the instructions described herein alternatively may be propagated by a communication medium (e.g., an electromagnetic signal, an optical signal, etc.) that is not held by a physical device for a finite duration.

Aspects of logic subsystem 1502 and storage subsystem 1504 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 1500 implemented to perform a particular function. In some cases, a module, program, or engine may be instantiated via logic subsystem 1502 executing instructions held by storage subsystem 1504. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices.

When included, display subsystem 1506 may be used to present a visual representation of data held by storage subsystem 1504. This visual representation may take the form of a graphical user interface (GUI). As the herein described methods and processes change the data held by the storage subsystem, and thus transform the state of the storage subsystem, the state of display subsystem 1506 may likewise be transformed to visually represent changes in the underlying data. Display subsystem 1506 may include one or more display devices utilizing virtually any type of technology. Such display devices may be combined with logic subsystem 1502 and/or storage subsystem 1504 in a shared enclosure, or such display devices may be peripheral display devices.

When included, input subsystem 1508 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 1510 may be configured to communicatively couple computing system 1500 with one or more other computing devices. Communication subsystem 1510 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 1500 to send and/or receive messages to and/or from other devices via a network such as the Internet.

Another example provides a videoconferencing system comprising a processor, and a storage device storing instructions executable by the processor to obtain an image of a scene acquired via a camera, the image of the scene comprising image distortion arising from a camera pitch angle at which the image of the scene was acquired, apply a projection mapping to the image of the scene to map the image of the scene to a projection comprising a tilt parameter that is based upon the camera pitch angle at which the image of the scene was acquired, thereby obtaining a corrected image, and output the corrected image. In some such examples, the videoconferencing system comprises the camera and a display, and wherein the camera is positioned to a side of the display. In some such examples, the camera comprises a tilt sensor configured to provide output based upon the camera pitch angle, and the instructions are further executable to, based upon the output from the tilt sensor, select the projection mapping from a plurality of projection mappings, each projection mapping being based upon a different camera pitch angle. In some such examples, the camera comprises an f-θ lens. In some such examples, the instructions are further executable to select the projection mapping based upon a rotational position of the camera. In some such examples, the camera comprises an oversized image sensor, and the instructions are executable to crop the image to form a vertically offset region of interest. In some such examples, the image of the scene comprises a horizontal field of view of between 70° and 145° degrees. In some such examples, the projection mapping comprises a tilted cylindrical projection, a tilted spherical projection, or a tilted rectilinear projection. In some such examples, the instructions are further executable to apply the projection mapping based upon a location of a camera-specific optical center of a camera lens relative to the image sensor. In some such examples, the instructions are executable to crop the image of the scene before applying the projection mapping.

Another example provides a method for operating a videoconferencing system, the method comprising obtaining an image of a scene acquired via a camera, the image of the scene comprising image distortion arising from a camera pitch angle at which the image of the scene was acquired, applying a projection mapping to the image of the scene to map the image of the scene to a projection comprising a tilt parameter that is based upon a camera pitch angle at which the image of the scene was acquired, thereby obtaining a corrected image, and outputting the corrected image. In some such examples, applying the projection mapping to the image of the scene comprises applying a tilted cylindrical projection, a tilted spherical projection, or a tilted rectilinear projection. In some such examples, the method further comprises selecting the projection mapping from a plurality of projection mappings each corresponding to a different camera pitch angle. In some such examples, applying the projection mapping is based upon a position of an optical center of a camera lens relative to an image sensor of the camera. In some such examples, the method further comprises cropping the image of the scene before applying the projection mapping. In some such examples, the image of the scene comprises a horizontal field of view of between 70° and 145° degrees.

Another example provides a computer-readable storage device comprising instructions executable by a videoconferencing system to correct for image distortion by obtaining an image of a scene acquired via a camera, applying a projection mapping to the image of the scene to map the image of the scene to a projection comprising a tilt parameter that is based upon a camera pitch angle at which the image of the scene was acquired, thereby obtaining a corrected image, and outputting the corrected image. In some such examples, the instructions are executable to apply the projection mapping to the image of the scene of the scene by applying a tilted cylindrical projection, a tilted spherical projection, or a tilted rectilinear projection. In some such examples, the instructions are further executable to receive input from a tilt sensor regarding the camera pitch angle, and to select the projection mapping from a plurality of projections mappings each corresponding to a different camera pitch angle. In some such examples, the instructions are further executable to select the projection mapping based upon a rotational position of the camera.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A videoconferencing system, comprising:
   a processor; and
   a storage device storing instructions executable by the processor to
      obtain an image of a scene acquired via a camera, the image of the scene comprising image distortion arising from a camera pitch angle at which the image of the scene was acquired;
      apply a projection mapping to the image of the scene to map the image of the scene to a projection comprising a tilt parameter that is based upon the camera pitch angle at which the image of the scene was acquired, thereby obtaining a corrected image; and
      output the corrected image;
   wherein the projection mapping comprises a tilted cylindrical projection, a tilted spherical projection, or a tilted rectilinear projection,
   wherein the tilted cylindrical projection, the tilted spherical projection, or the tilted rectilinear projection is tilted by the tilt parameter with respect to an optical axis of the camera, and
   wherein the tilted cylindrical projection, the tilted spherical projection, or the tilted rectilinear projection is tilted at a pivot point located on the optical axis of the camera and spaced from the camera.

2. The videoconferencing system of claim 1, wherein the camera comprises a tilt sensor configured to provide output based upon the camera pitch angle, and wherein the instructions are further executable to, based upon the output from the tilt sensor, select the projection mapping from a plurality of projection mappings, each projection mapping being based upon a different camera pitch angle.

3. The videoconferencing system of claim 1, wherein the camera comprises a f-θ lens.

4. The videoconferencing system of claim 1, wherein the instructions are further executable to select the projection mapping based upon a rotational position of the camera.

5. The video conference system of claim 1, wherein the camera comprises an oversized image sensor, and wherein the instructions are executable to crop the image, using a cropping region vertically offset from the image center, to form a vertically offset region of interest.

6. The videoconferencing system of claim 1, wherein the image of the scene comprises a horizontal field of view of between 70° and 145° degrees.

7. The videoconferencing system of claim 1, wherein the instructions are further executable to apply the projection mapping based upon a location of a camera-specific optical center of a camera lens relative to the image sensor.

8. The videoconferencing system of claim 1, wherein the instructions are executable to crop the image of the scene before applying the projection mapping.

9. A method for operating a videoconferencing system, the method comprising:
   obtaining an image of a scene acquired via a camera, the image of the scene comprising image distortion arising from a camera pitch angle at which the image of the scene was acquired;

applying a projection mapping to the image of the scene to map the image of the scene to a projection comprising a tilt parameter that is based upon a camera pitch angle at which the image of the scene was acquired, thereby obtaining a corrected image; and
outputting the corrected image;
wherein applying the projection mapping to the image of the scene comprises applying a tilted cylindrical projection, a tilted spherical projection, or a tilted rectilinear projection,
wherein the tilted cylindrical projection, the tilted spherical projection, or the tilted rectilinear projection is tilted by the tilt parameter with respect to an optical axis of the camera, and
wherein the tilted cylindrical projection, the tilted spherical projection, or the tilted rectilinear projection is tilted at a pivot point located on the optical axis of the camera and spaced from the camera.

10. The method of claim 9, further comprising selecting the projection mapping from a plurality of projection mappings each corresponding to a different camera pitch angle.

11. The method of claim 9, wherein applying the projection mapping is based upon a position of an optical center of a camera lens relative to an image sensor of the camera.

12. The method of claim 9, further comprising cropping the image of the scene before applying the projection mapping.

13. The method of claim 9, wherein the image of the scene comprises a horizontal field of view of between 70° and 180° degrees.

14. The method of claim 13, wherein the image of the scene comprises a horizontal field of view of between 70° and 145° degrees.

15. A computer-readable storage device comprising instructions executable by a videoconferencing system to correct for image distortion by:
obtaining an image of a scene acquired via a camera;
applying a projection mapping to the image of the scene to map the image of the scene to a projection comprising a tilt parameter that is based upon a camera pitch angle at which the image of the scene was acquired, thereby obtaining a corrected image; and
outputting the corrected image; wherein the instructions are executable to apply the projection mapping to the image of the scene of the scene by applying a tilted cylindrical projection, a tilted spherical projection, or a tilted rectilinear projection,
wherein the tilted cylindrical projection, the tilted spherical projection, or the tilted rectilinear projection is tilted by the tilt parameter with respect to an optical axis of the camera, and
wherein the tilted cylindrical projection, the tilted spherical projection, or the tilted rectilinear projection is tilted at a pivot point located on the optical axis of the camera and spaced from the camera.

16. The computer-readable storage device of claim 15, wherein the instructions are further executable to receive input from a tilt sensor regarding the camera pitch angle, and to select the projection mapping from a plurality of projections mappings each corresponding to a different camera pitch angle.

17. The computer-readable storage device of claim 16, wherein the instructions are further executable to select the projection mapping based upon a rotational position of the camera.

18. The computer-readable storage device of claim 15, wherein the instructions are executable to crop the image of the scene before applying the projection mapping.

19. The computer-readable storage device of claim 15, wherein the instructions are executable to apply the projection mapping based upon a position of an optical center of a camera lens relative to an image sensor of the camera.

* * * * *